(12) United States Patent
Baxter et al.

(10) Patent No.: US 10,047,863 B1
(45) Date of Patent: Aug. 14, 2018

(54) DIAPHRAGMS WITH ENCAPSULATED SPRINGS

(71) Applicants: Larry Baxter, Orem, UT (US); Nathan Davis, Bountiful, UT (US); Aaron Sayre, Spanish Fork, UT (US); David Frankman, Provo, UT (US); Kyler Stitt, Lindon, UT (US); Skyler Chamberlain, Provo, UT (US)

(72) Inventors: Larry Baxter, Orem, UT (US); Nathan Davis, Bountiful, UT (US); Aaron Sayre, Spanish Fork, UT (US); David Frankman, Provo, UT (US); Kyler Stitt, Lindon, UT (US); Skyler Chamberlain, Provo, UT (US)

( * ) Notice: Subject to any disclaimer, the term of this patent is extended or adjusted under 35 U.S.C. 154(b) by 0 days.

(21) Appl. No.: 15/603,710

(22) Filed: May 24, 2017

(51) Int. Cl.
| | |
|---|---|
| *F16K 7/12* | (2006.01) |
| *F16J 3/02* | (2006.01) |
| *G01L 9/00* | (2006.01) |
| *F04B 43/02* | (2006.01) |
| *F16K 31/00* | (2006.01) |

(52) U.S. Cl.
CPC ............... *F16J 3/02* (2013.01); *F04B 43/026* (2013.01); *F16K 7/123* (2013.01); *G01L 9/0044* (2013.01); *F16K 31/00* (2013.01)

(58) Field of Classification Search
CPC . F16J 3/02; F04B 43/026; F16K 7/123; F16K 31/00; F16K 7/12; F16K 7/126; F16K 7/14; F16K 7/16; F16K 7/17; G01L 9/0044
USPC .................... 251/331, 335.2, 337; 92/89–105
See application file for complete search history.

(56) References Cited

U.S. PATENT DOCUMENTS

| | | | | | |
|---|---|---|---|---|---|
| 356,997 | A | * | 2/1887 | Gil ............................ | F04B 9/14 92/103 R |
| 2,178,953 | A | * | 11/1939 | Chilton ..................... | F16J 3/06 92/101 |
| 2,324,880 | A | * | 7/1943 | Rogers ...................... | F16K 7/12 251/331 |
| 2,578,730 | A | * | 12/1951 | Nicholson .................. | F16J 3/02 92/100 |
| 2,684,829 | A | * | 7/1954 | McFarland, Jr. ......... | F16K 7/126 251/267 |
| 2,710,629 | A | * | 6/1955 | Price ......................... | F16J 3/02 248/346.11 |
| 3,026,909 | A | * | 3/1962 | Boteler ...................... | F16J 3/02 251/331 |
| 3,130,954 | A | * | 4/1964 | McFarland, Jr. ......... | F16K 7/126 251/331 |
| 3,416,783 | A | * | 12/1968 | Tondato ..................... | F16F 3/12 213/40 R |
| 4,071,041 | A | * | 1/1978 | Moran, Jr. ................ | F16K 5/201 251/360 |

(Continued)

FOREIGN PATENT DOCUMENTS

EP 87823 A1 * 9/1983

*Primary Examiner* — John Bastianelli

(57) ABSTRACT

A device is disclosed comprising a diaphragm mechanism. A diaphragm mechanism comprises an enclosure defined by opposing flexible walls joined along a perimeter of the enclosure and one or more coiled springs contained entirely between the opposed flexible walls. A central, helical axis of the one or more coiled springs is disposed substantially parallel to the opposed flexible walls and arrayed in concentric spirals around a central hole or arrayed in parallel bands.

20 Claims, 16 Drawing Sheets

(56) References Cited

U.S. PATENT DOCUMENTS

| | | | | |
|---|---|---|---|---|
| 5,145,336 A | * | 9/1992 | Becker | F04B 43/0054 |
| | | | | 417/413.1 |
| 5,291,822 A | * | 3/1994 | Alsobrooks | F16J 3/02 |
| | | | | 92/100 |
| 2005/0142005 A1 | * | 6/2005 | Traylor | F04B 43/0054 |
| | | | | 417/394 |

* cited by examiner

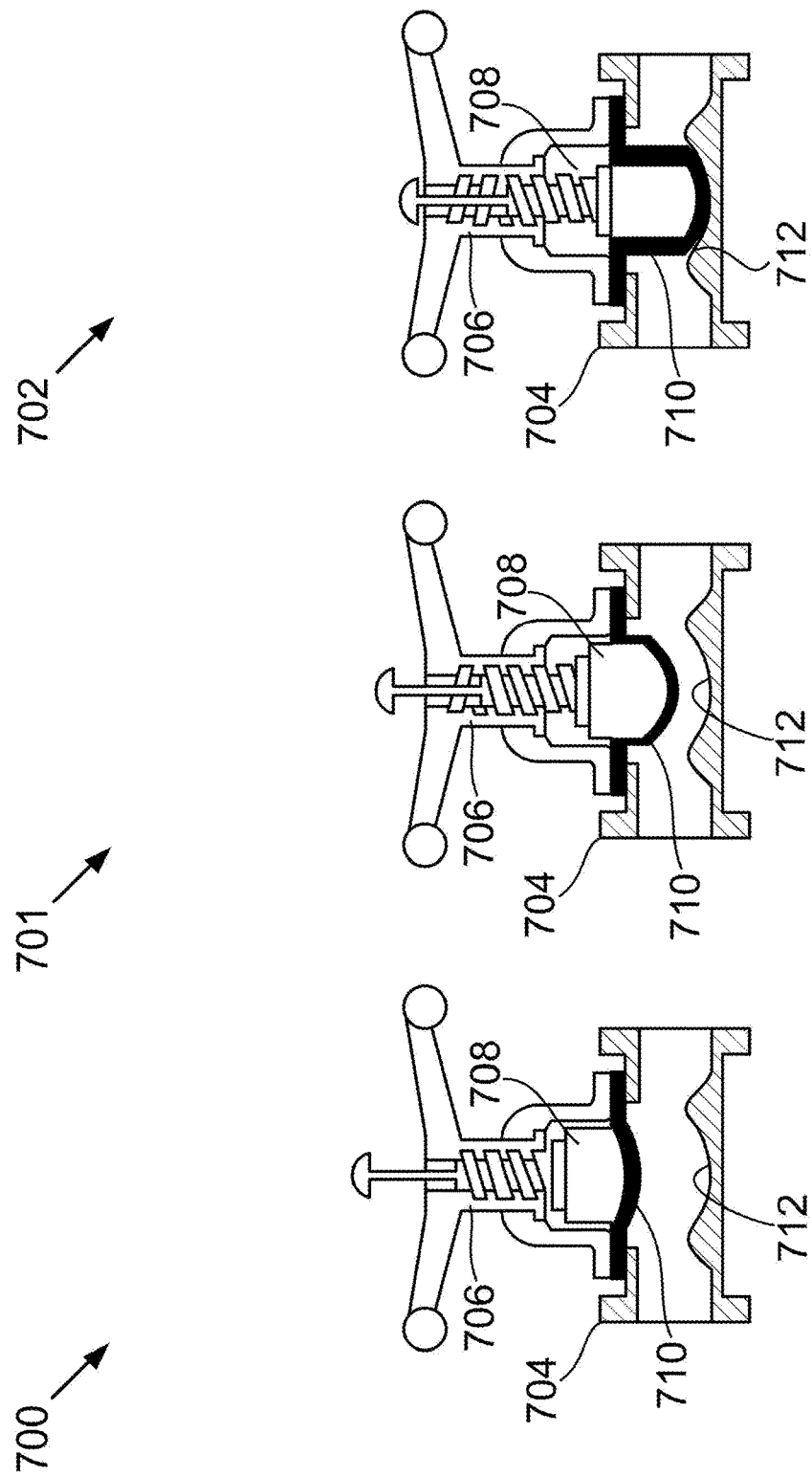

US 10,047,863 B1

DIAPHRAGMS WITH ENCAPSULATED SPRINGS

This invention was made with government support under DE-FE0028697 awarded by The Department of Energy. The government has certain rights in the invention.

FIELD OF THE INVENTION

This invention relates generally to diaphragm construction. More particularly, we are interested in diaphragm construction capable of handling cryogenic temperatures.

BACKGROUND

Liquid and slurry material handling requires many types of equipment. In some instances, equipment utilizes rubber and other types of flexible diaphragms to control and move these materials. This includes diaphragm pumps, diaphragm valves, and even pressure sensors. Each of these require a flexible diaphragm to operate. These flexible diaphragms wear out, and longer life, more durable flexible diaphragms are required, especially in applications where the diaphragm is deformed and required to return to the rest position after removal of the deforming force. Useful life of the diaphragm is not only dependent on the resilient nature of the flexible diaphragm, but also on the magnitude of deforming forces imposed on the diaphragm. A fine line exists between effective deforming force and undue or excessive force that physically crushes the diaphragm. The inventors are unaware of a suitable diaphragm that addresses these issues effectively.

Further, with recent advances in large scale cryogenic processes, the ability to move large quantities of cryogenic liquids and slurries is becoming increasingly critical. Flexible diaphragms have limited usability at cryogenic temperatures. As such, flexible diaphragms suitable for operations at cryogenic temperatures are also required, as the problems mentioned earlier are only exacerbated at cryogenic temperatures.

U.S. Pat. No. 3,026,909, to Boteler teaches a reinforced diaphragm. The present disclosure differs from this disclosure in that the prior art disclosure uses fabric, such as nylon, to reinforce the diaphragm, and not springs. This prior art disclosure is pertinent and may benefit from the devices disclosed herein and is hereby incorporated for reference in its entirety for all that it teaches.

U.S. Pat. No. 2,684,829, to Mcfarland teaches a valve diaphragm. The present disclosure differs from this disclosure in that the prior art disclosure uses an external metal plate for reinforcement of the diaphragm, and not internally situated materials. This prior art disclosure is pertinent and may benefit from the devices disclosed herein and is hereby incorporated for reference in its entirety for all that it teaches.

U.S. Pat. No. 2,710,629, to Hector teaches a flexible diaphragm. The present disclosure differs from this disclosure in that the prior art disclosure uses fabric to reinforce the diaphragm, and not springs. This prior art disclosure is pertinent and may benefit from the devices disclosed herein and is hereby incorporated for reference in its entirety for all that it teaches.

U.S. Pat. No. 5,145,336, to Becker, et al., teaches a diaphragm pump with a reinforced diaphragm. The diaphragm is reinforced with ribs. The present disclosure differs from this disclosure in that the prior art disclosure uses ribs to reinforce the diaphragm, and not springs. This prior art disclosure is pertinent and may benefit from the devices disclosed herein and is hereby incorporated for reference in its entirety for all that it teaches.

United States patent publication number 20050142005, to Traylor, teaches a submersible well pump with improved diaphragm. The present disclosure differs from this disclosure in that the prior art disclosure uses fibers to reinforce the diaphragm, and not springs. This prior art disclosure is pertinent and may benefit from the devices disclosed herein and is hereby incorporated for reference in its entirety for all that it teaches.

U.S. Pat. No. 0,087,823, to Sumner, teaches a diaphragm for a diaphragm pump or motor. The present disclosure differs from this disclosure in that the prior art disclosure uses fibers to reinforce the diaphragm, and not springs. This prior art disclosure is pertinent and may benefit from the devices disclosed herein and is hereby incorporated for reference in its entirety for all that it teaches.

SUMMARY

A device is disclosed comprising a diaphragm mechanism. The diaphragm mechanism comprises an enclosure defined by opposing flexible walls joined along a perimeter of the enclosure and one or more springs contained entirely between the opposed flexible walls. A central, helical axis of the one or more springs is disposed substantially parallel to the opposed flexible walls.

The diaphragm may be used in a diaphragm valve. The diaphragm valve may be actuated by an actuator comprising a manual actuator, an electric actuator, an electro-hydraulic actuator, a hydraulic actuator, an electro-pneumatic actuator, or a pneumatic actuator. The actuator may comprise an internal stop that prevents over-compression of the diaphragm.

The diaphragm may be used in a diaphragm-style pressure sensor.

The spring may spiral helically around a central point in a single plane, forming a disc shaped flexible diaphragm.

The diaphragm may be used in a diaphragm pump.

The flexible walls may comprise polytetrafluoroethylene, fluorinated ethylene propylene, perfluoroalkoxy polymer resin, polyether ether ketone, other polyaryl ether ketones, polyimides, the polyimide sold under the trademark of Vespel®, poly-oxydiphenylene-pyromellitimide, platinum-cured silicone, peroxide-cured silicone, thermoplastics, other rubbers, other polymers, or combinations thereof. The one or more springs may comprise steel, titanium, aluminum, nickel, cobalt, alloys thereof, and combinations thereof.

The diaphragm may maintain flexibility at cryogenic temperatures. A cryogenic fluid may be passed across the diaphragm, the cryogenic fluid comprising a liquid, a solid, or a combination thereof. The cryogenic liquid may comprise a liquid with a freezing point lower than the solids. The solids may comprise carbon dioxide, nitrogen oxide, sulfur dioxide, nitrogen dioxide, sulfur trioxide, hydrogen sulfide, hydrogen cyanide, water, mercury, hydrocarbons, pharmaceuticals, salts, biomass, particulates, other heavy metals, condensed organics, soot, inorganic ash components, salts, or combinations thereof.

The springs may be arrayed parallel to each other in a single plane, forming a rectangular flexible diaphragm. The springs may be arrayed parallel to each other in two planes, forming a rectangular flexible diaphragm with two layers of springs. The spring may spiral helically around a central point in a single plane, forming a disc shaped flexible diaphragm. The spring may spiral helically around a central point in two planes, forming a disc shaped flexible diaphragm. The spring may pass back and forth in multiple passes, forming a rectangular flexible diaphragm.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIGS. 7A-C show a diaphragm valve.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention.

Figure 1A:
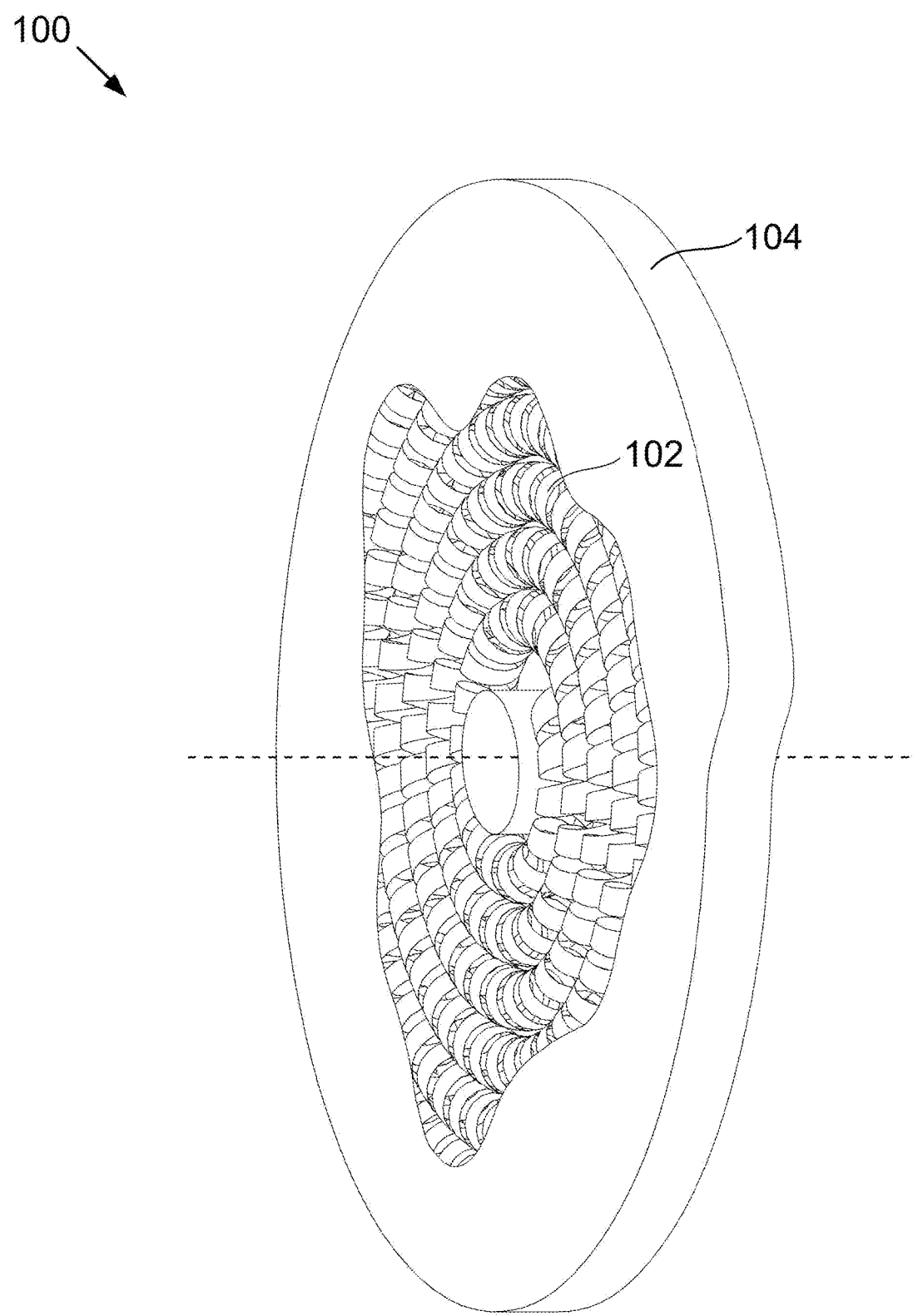
FIGS. 1A-B show an isometric view of a flexible diaphragm and a face view of the flexible diaphragm.
Figure 1B:
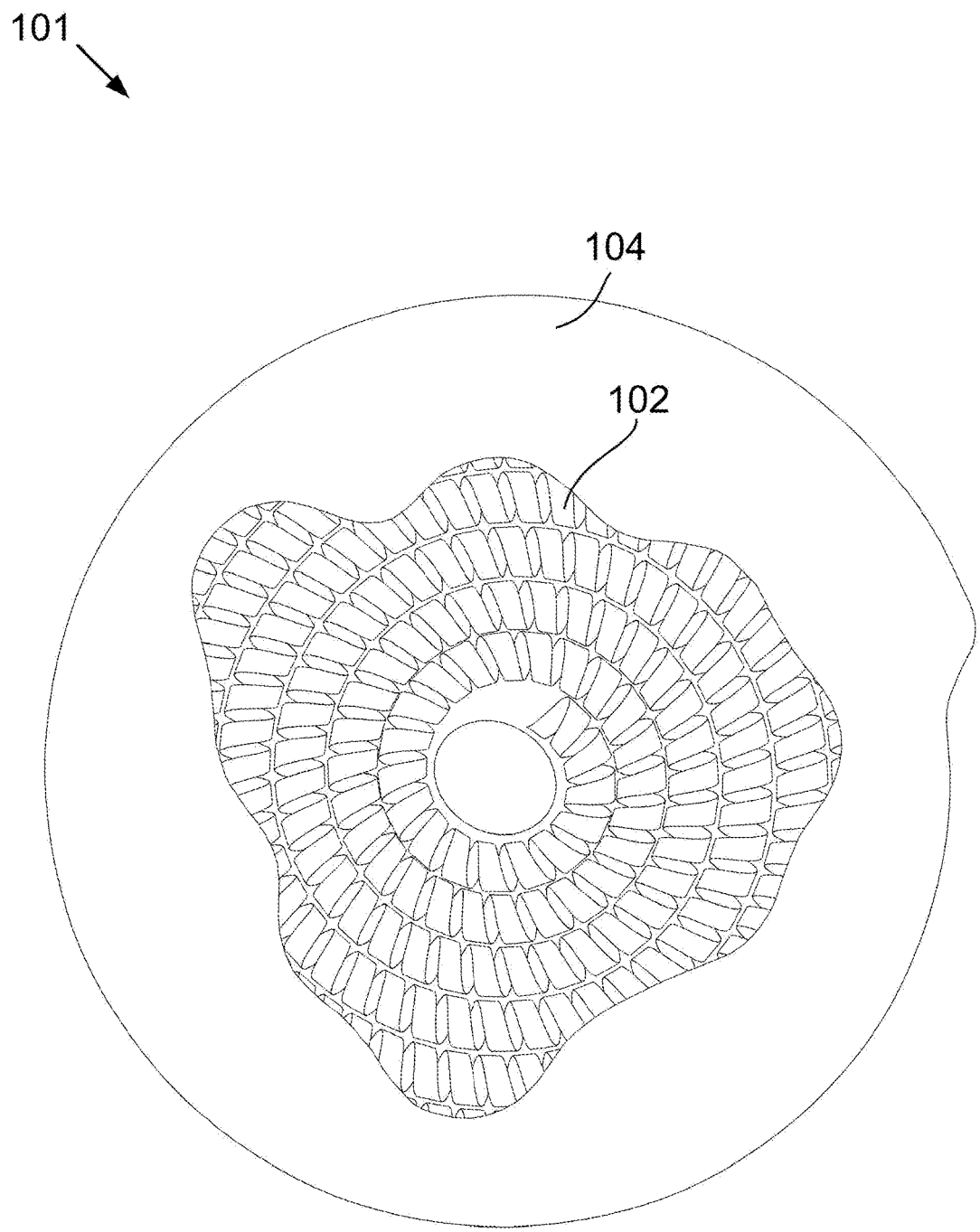

Referring to FIGS. 1A-B, an isometric view of a flexible diaphragm is shown at 100 and a face view of the flexible diaphragm is shown at 101, as per one embodiment of the present invention. Diaphragm 104 comprises flexible walls and compression flat-coil spring 102. Spring 102 is arrayed in concentric spirals around a central hole, diaphragm 104 thereby forming a round diaphragm. Diaphragm 104 is able to flex and deform under force, but when the force is removed, is able to return to the original conformation due to spring 102. In some embodiments, diaphragm 104 is used as a diaphragm in a diaphragm valve. In some embodiments, the flexible diaphragm is used in a diaphragm-style pressure sensor. In some embodiments, the flexible diaphragm is used in a diaphragm pump.

Figure 2A:
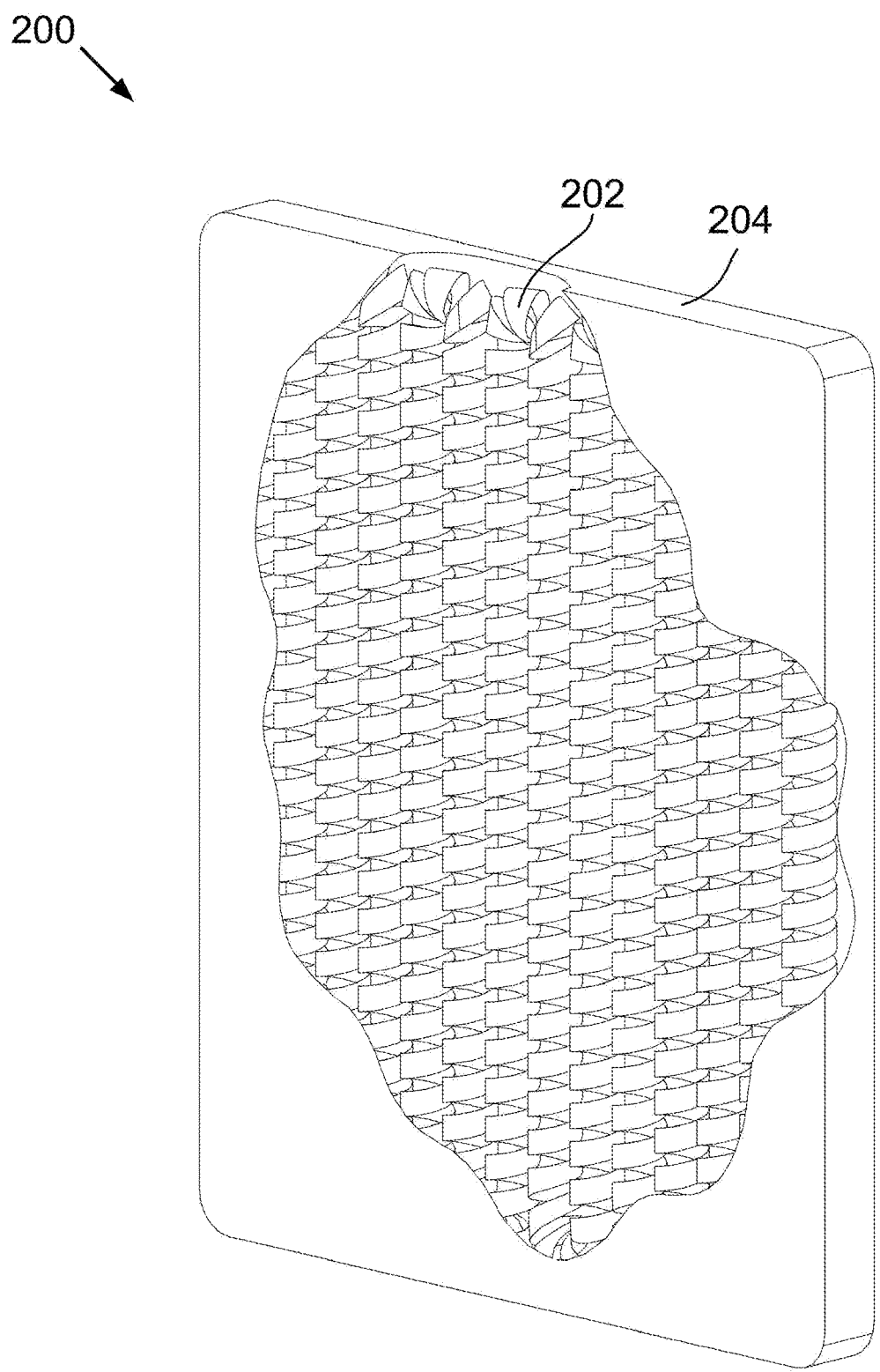
FIGS. 2A-B show an isometric view of a flexible diaphragm and a face view of the flexible diaphragm.
Figure 2B:
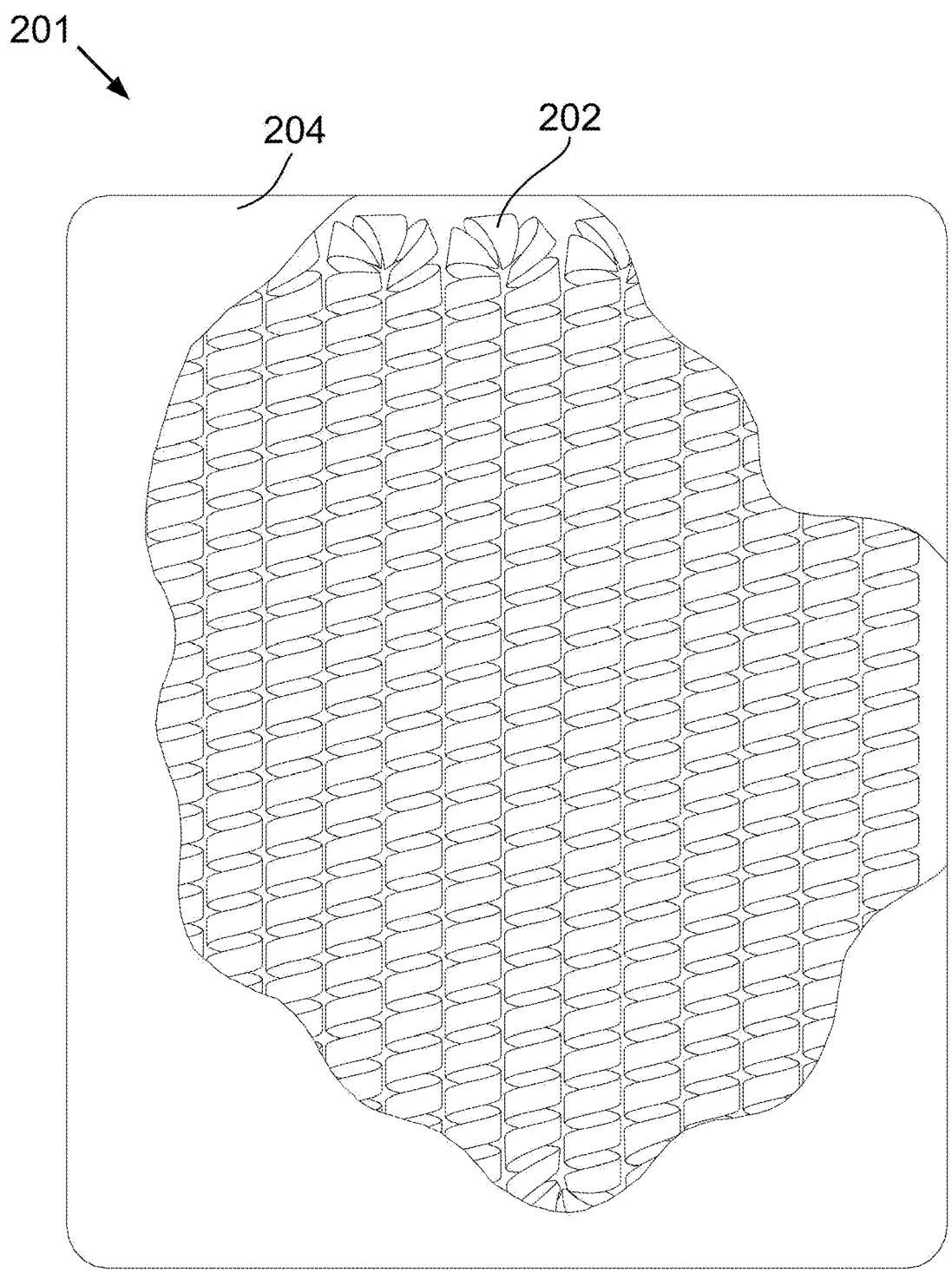

Referring to FIGS. 2A-B, an isometric view of a flexible diaphragm is shown at 200 and a face view of the flexible diaphragm is shown at 201, as per one embodiment of the present invention. Diaphragm 204 comprises flexible walls and compression flat-coil spring 202. Spring 202 is arrayed in parallel bands, spring 202 thereby forming the shape of a rectangular diaphragm. Diaphragm 204 is able to flex and deform under force, but when the force is removed, is able to return to the original conformation due to spring 202. In some embodiments, the flexible diaphragm is used in a diaphragm valve. In some embodiments, diaphragm 202 is used in a diaphragm-style pressure sensor. In some embodiments, diaphragm 202 is used in a diaphragm pump.

Figure 3A:
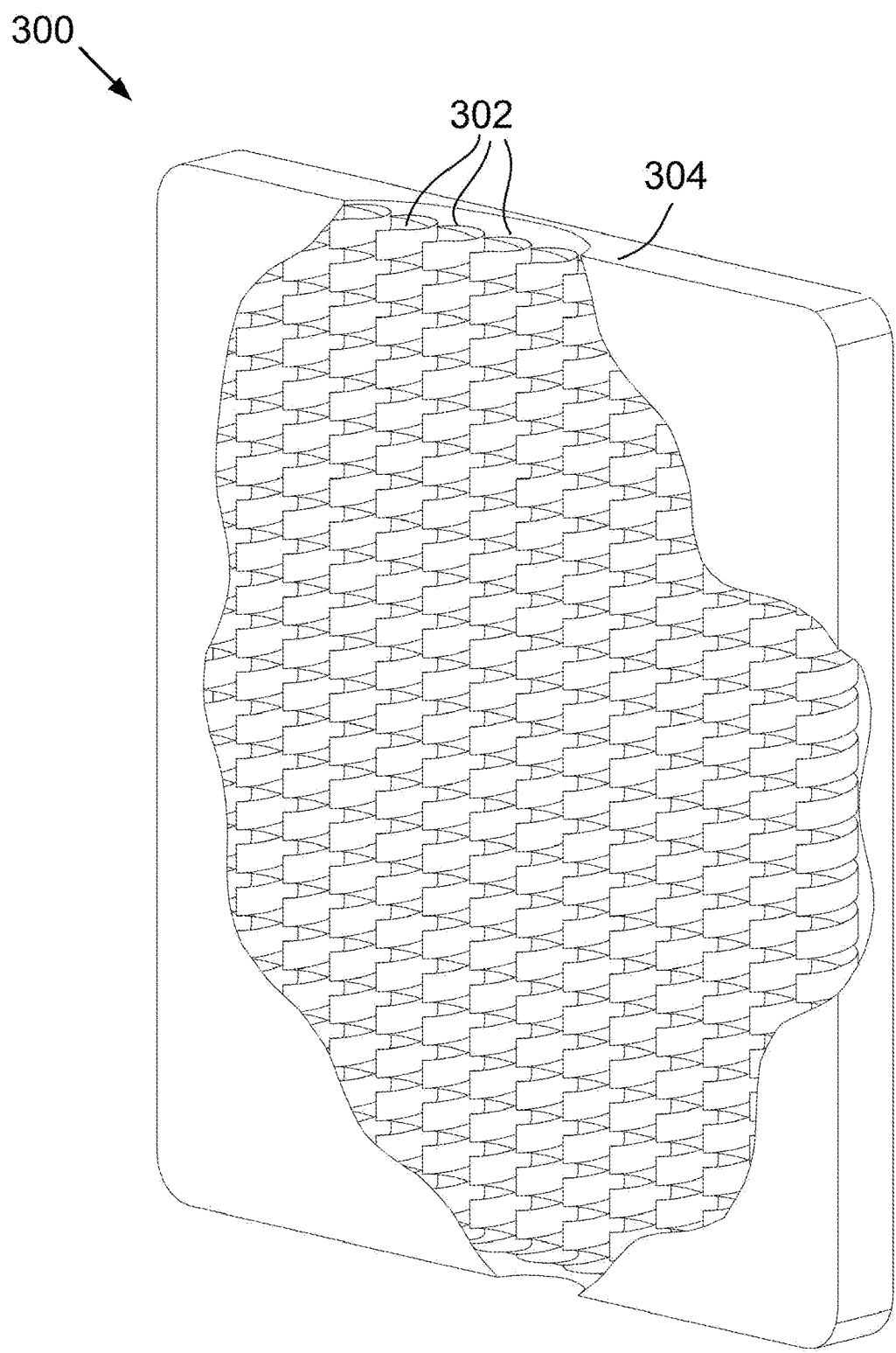
FIGS. 3A-B show an isometric view of a flexible diaphragm and a face view of the flexible diaphragm.
Figure 3B:
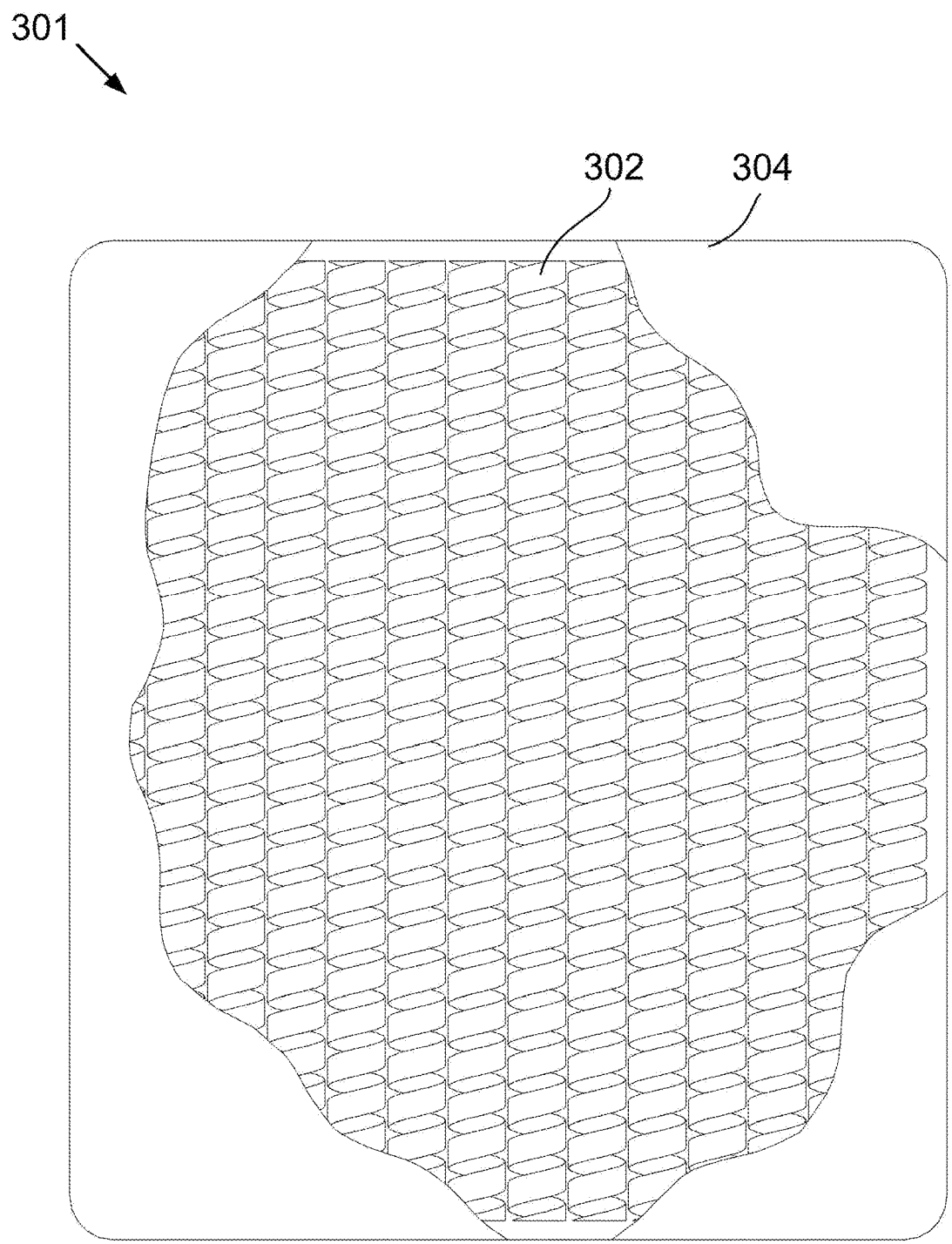

Referring to FIGS. 3A-B, an isometric view of a flexible diaphragm is shown at 300 and a face view of the flexible diaphragm is shown at 301, as per one embodiment of the present invention. Diaphragm 304 comprises flexible walls and compression flat-coil springs 302. Springs 302 are arrayed in parallel bands forming the shape of a rectangular diaphragm. Diaphragm 304 is able to flex and deform under force, but when the force is removed, is able to return to the original conformation due to spring 302. In some embodiments, diaphragm 304 is used in a diaphragm valve. In some embodiments, diaphragm 304 is used in a diaphragm-style pressure sensor. In some embodiments, the flexible diaphragm is used in a diaphragm pump.

Figure 4A:
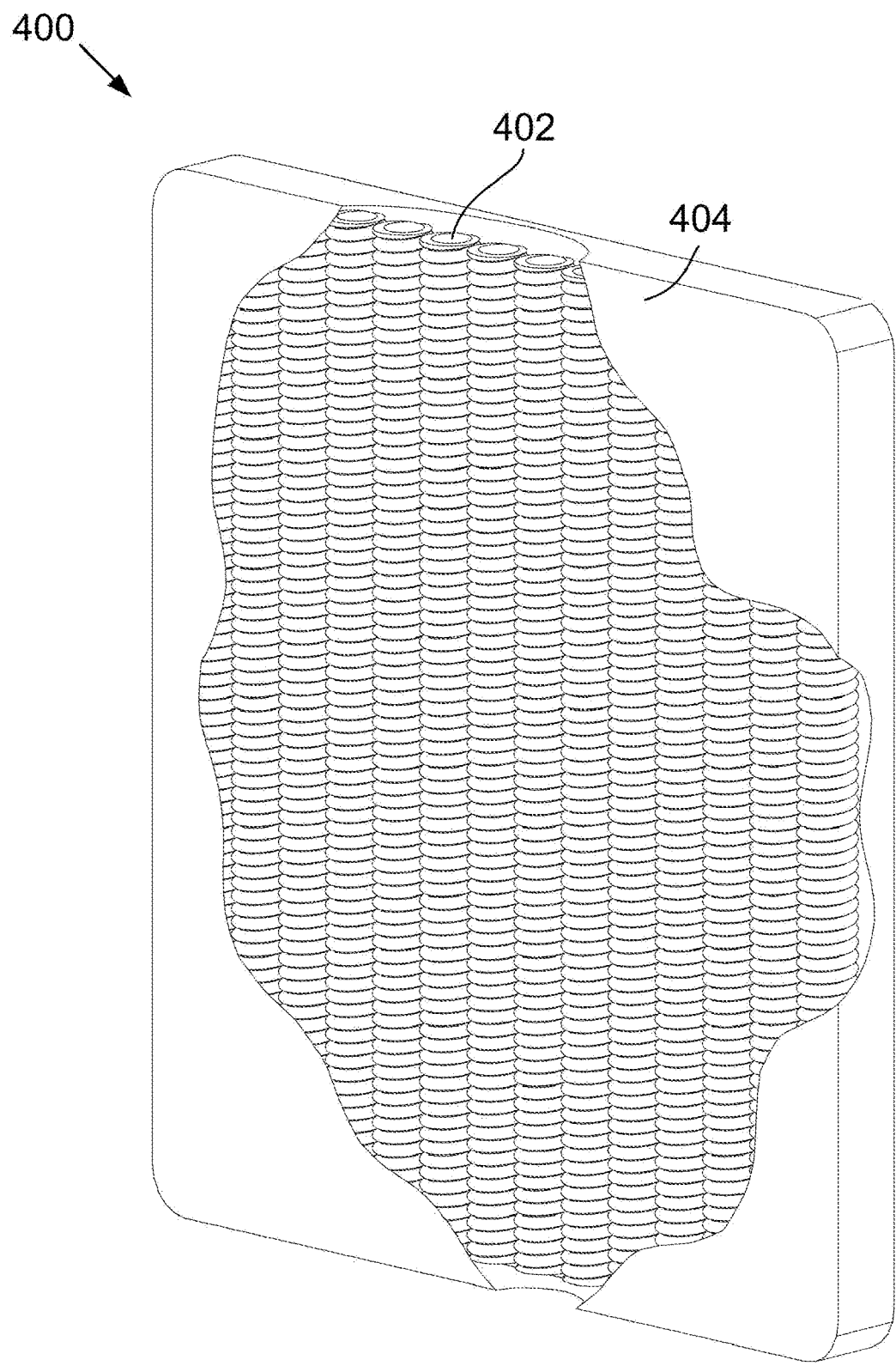
FIGS. 4A-B show an isometric view of a flexible diaphragm and a face view of the flexible diaphragm.
Figure 4B:
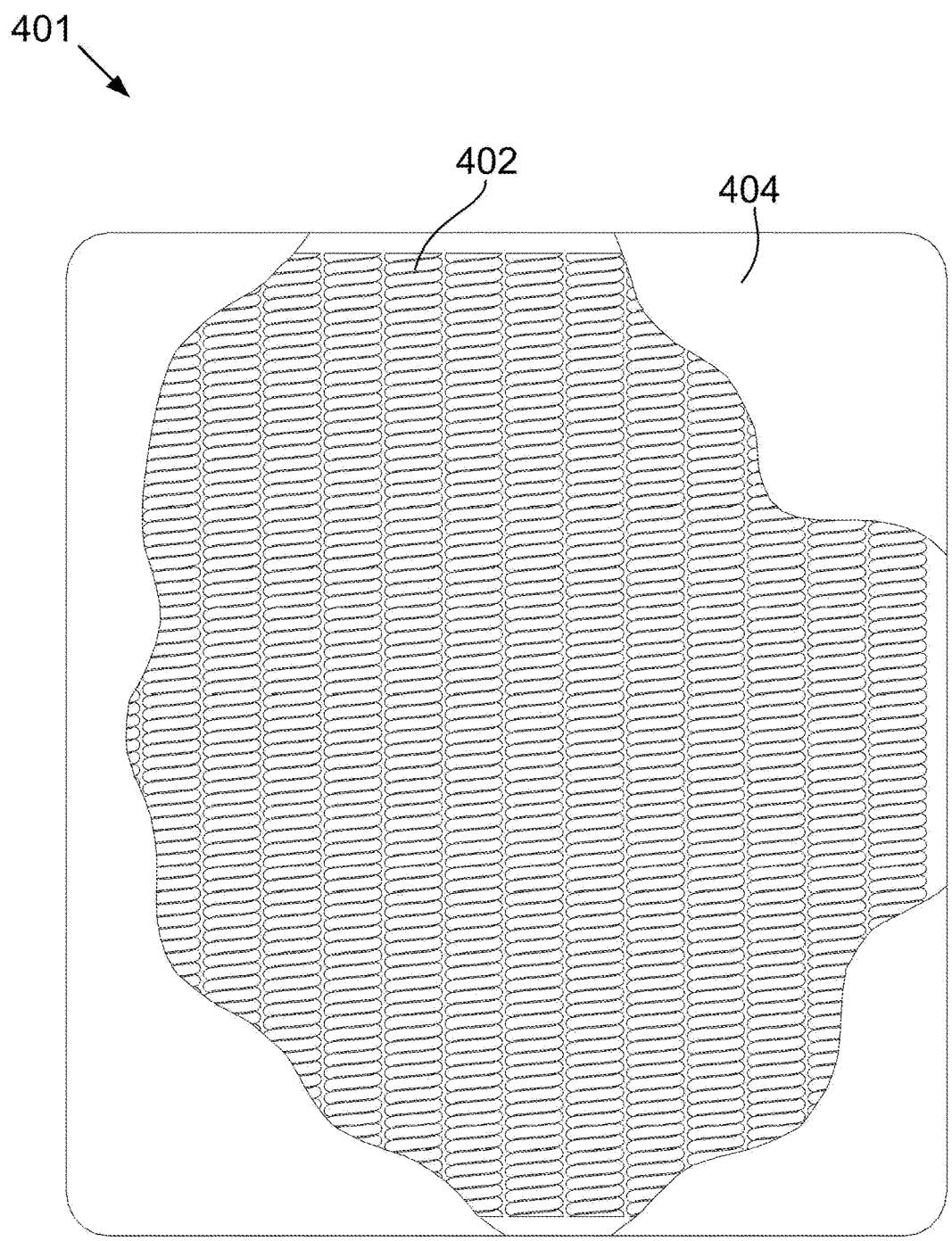

Referring to FIGS. 4A-B, an isometric view of a flexible diaphragm is shown at 400 and a face view of the flexible diaphragm is shown at 401, as per one embodiment of the present invention. Diaphragm 404 comprises flexible walls and extension springs 402. Springs 402 are arrayed in parallel bands forming the shape of a rectangular diaphragm. Diaphragm 404 is able to flex and deform under force, but when the force is removed, is able to return to the original conformation due to spring 402. In some embodiments, diaphragm 404 is used in a diaphragm valve. In some embodiments, diaphragm 404 is used in a diaphragm-style pressure sensor. In some embodiments, the flexible diaphragm is used in a diaphragm pump.

Figure 5A:
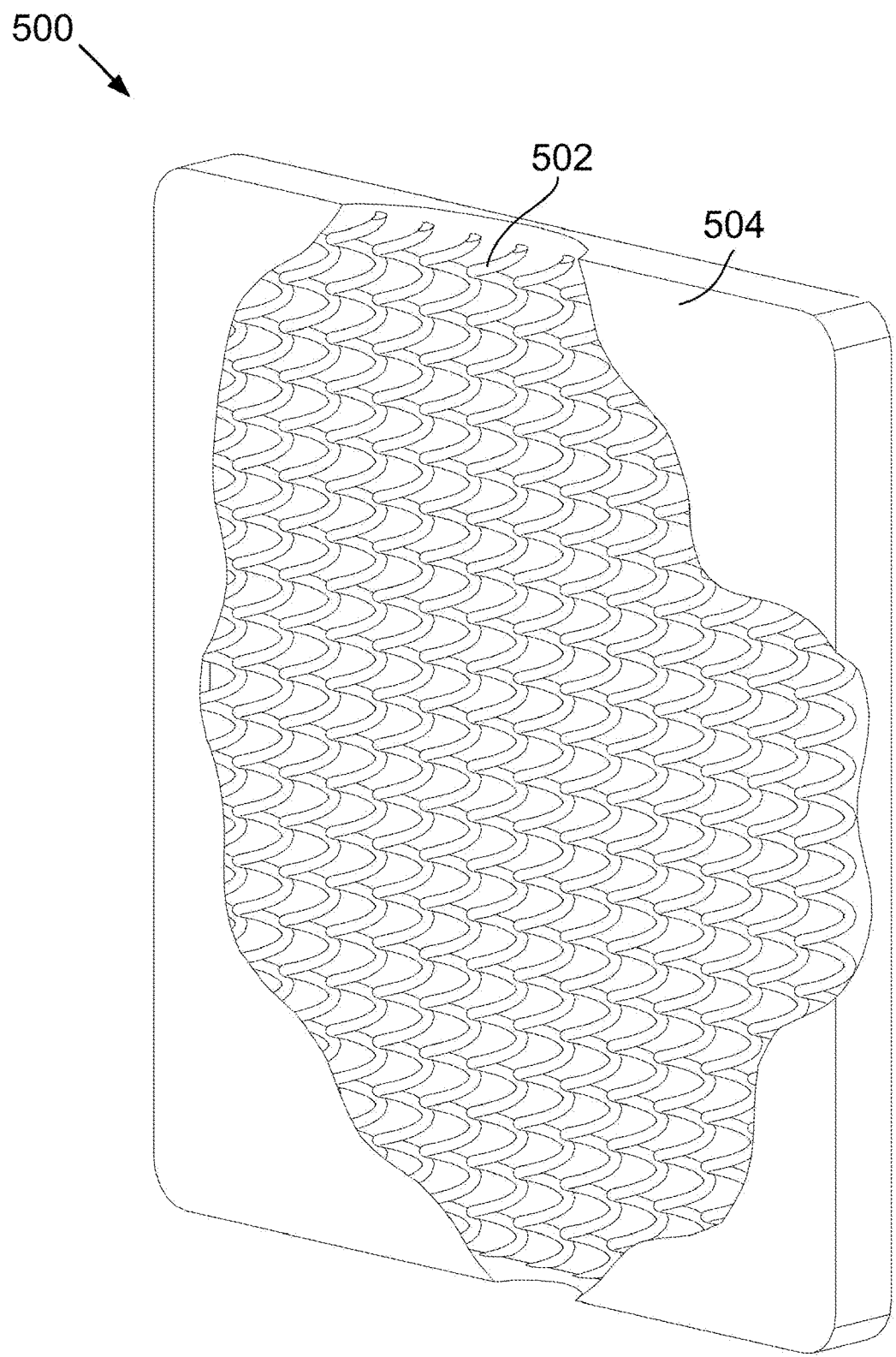
FIGS. 5A-B show an isometric view of a flexible diaphragm and a face view of the flexible diaphragm.
Figure 5B:
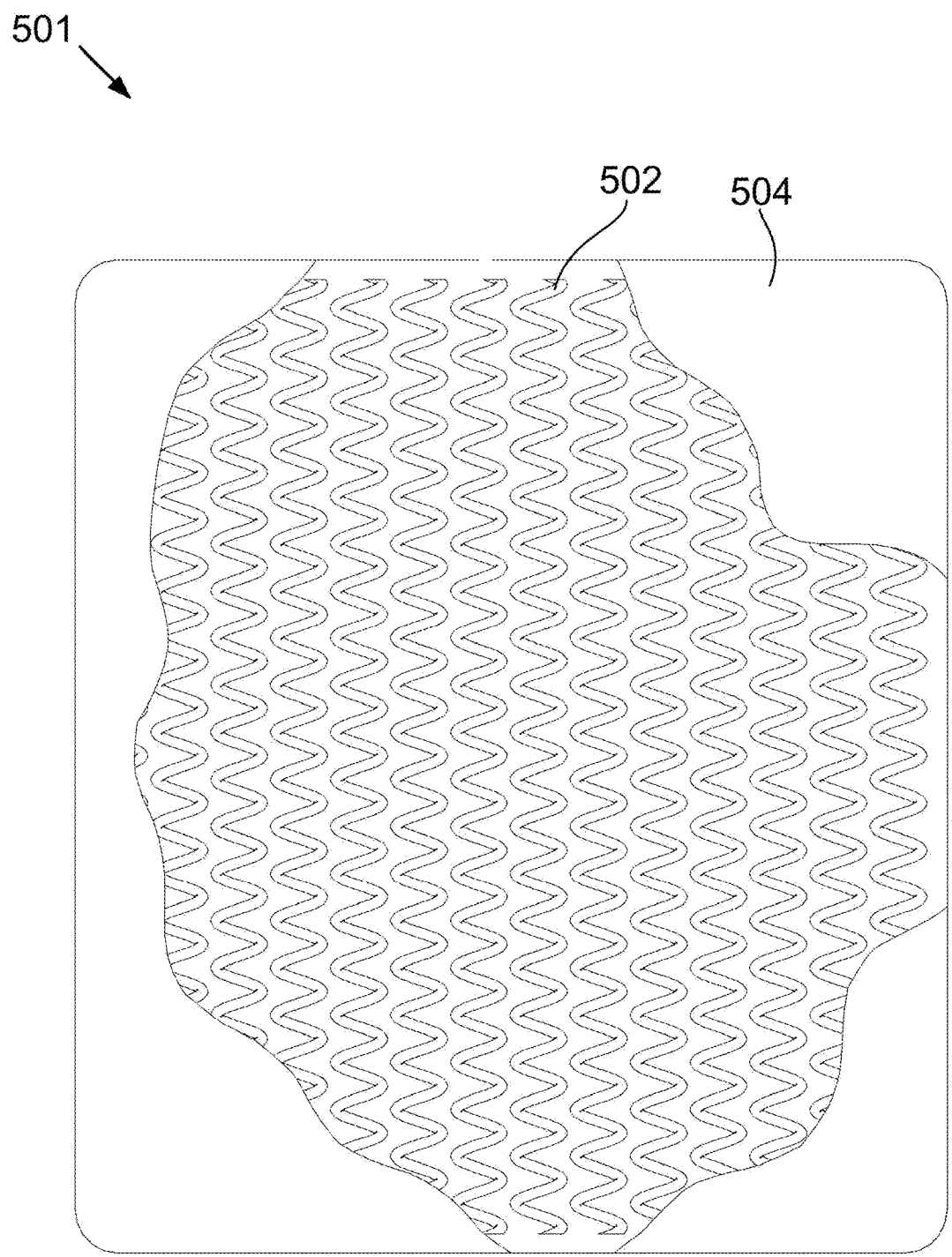

Referring to FIGS. 5A-B, an isometric view of a flexible diaphragm is shown at 500 and a face view of the flexible diaphragm is shown at 501, as per one embodiment of the present invention. Diaphragm 504 comprises flexible walls and compression springs 502. Springs 502 are arrayed in parallel bands forming the shape of a rectangular diaphragm. Diaphragm 504 is able to flex and deform under force, but when the force is removed, is able to return to the original conformation due to spring 502. In some embodiments, diaphragm 504 is used in a diaphragm valve. In some embodiments, diaphragm 504 is used in a diaphragm-style pressure sensor. In some embodiments, the flexible diaphragm is used in a diaphragm pump.

Figure 6A:
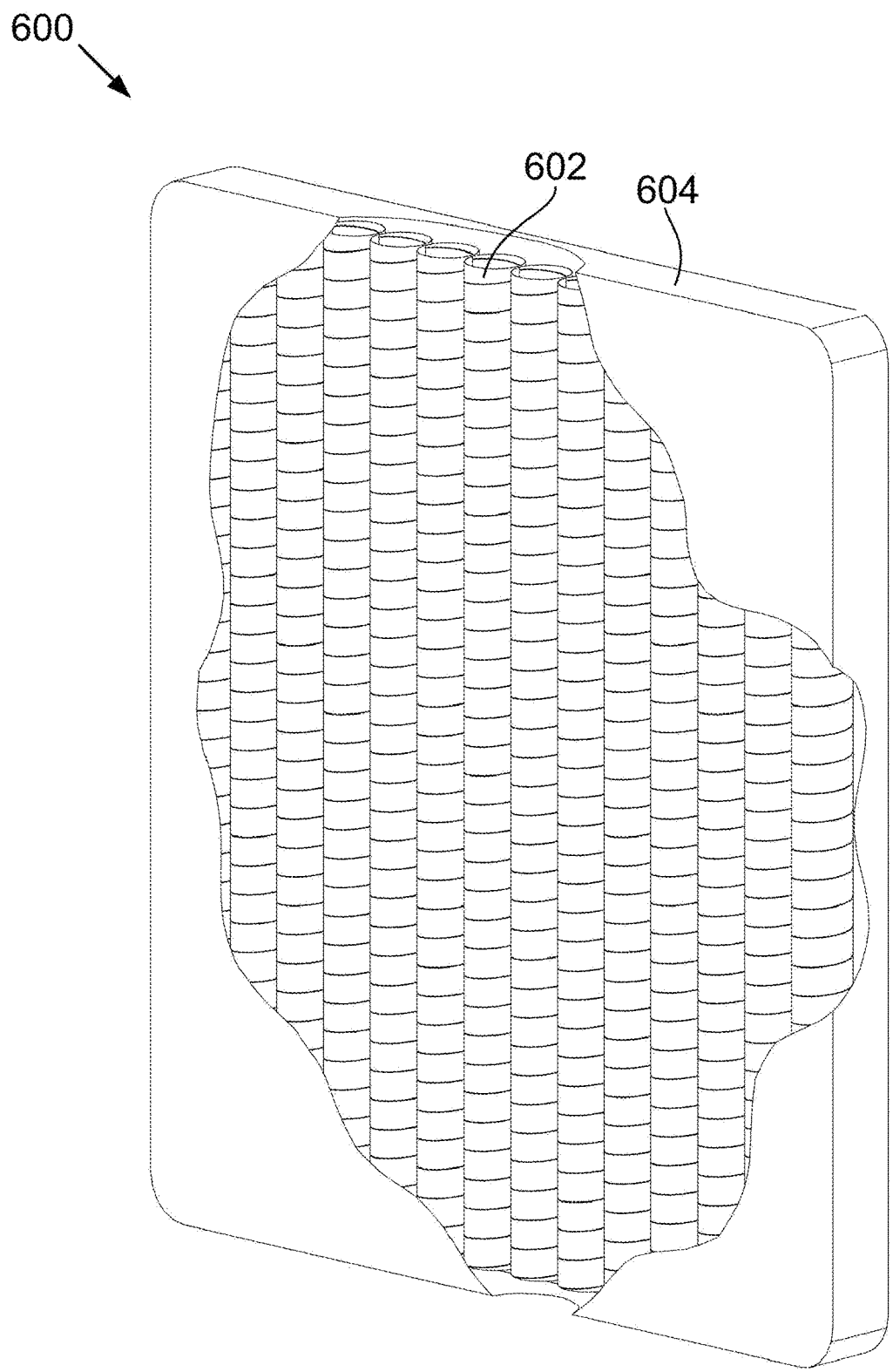
FIGS. 6A-B show an isometric view of a flexible diaphragm and a face view of the flexible diaphragm.
Figure 6B:
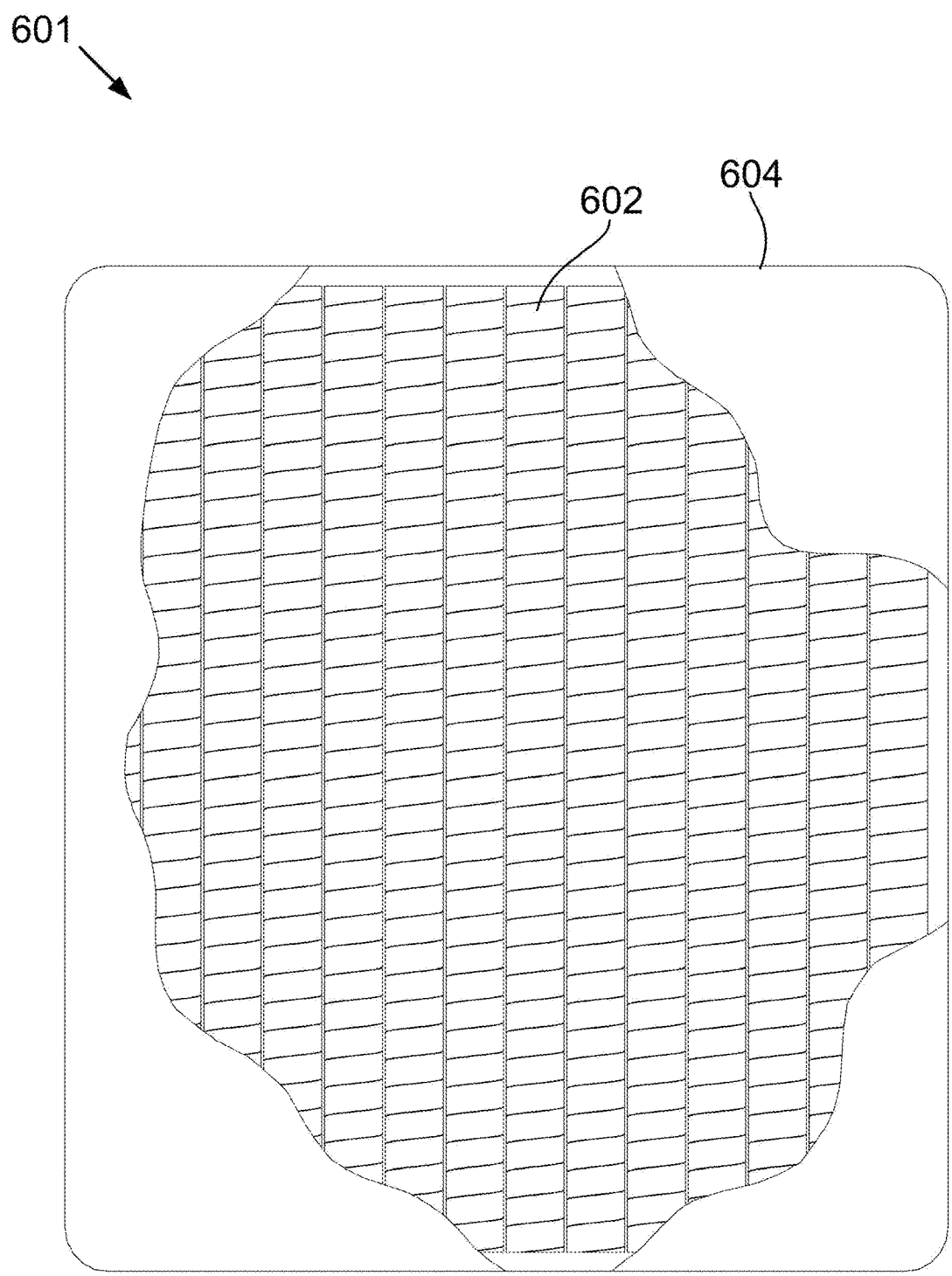

Referring to FIGS. 6A-B, an isometric view of a flexible diaphragm is shown at 600 and a face view of the flexible diaphragm is shown at 601, as per one embodiment of the present invention. Diaphragm 604 comprises flexible walls and extension flat-coil springs 602. Springs 602 are arrayed in parallel bands forming the shape of a rectangular diaphragm. Diaphragm 604 is able to flex and deform under force, but when the force is removed, is able to return to the original conformation due to spring 602. In some embodiments, diaphragm 604 is used in a diaphragm valve. In some embodiments, diaphragm 604 is used in a diaphragm-style pressure sensor. In some embodiments, diaphragm 604 is used in a diaphragm pump.

Referring to FIGS. 7A-C, a side view of a diaphragm valve is shown at 700, 701, and 702, as per one embodiment of the present invention. Valve 704 is shown open at 700, partially closed at 701, and closed at 702. Valve 704 comprises a plunger 708, actuator assembly 706, seat 712, and flexible diaphragm 710. Flexible diaphragm 710 is a rectangular flexible diaphragm as in FIGS. 2A-B. Actuator assembly 706 advances or retracts plunger 708 manually. Plunger 708 deforms flexible diaphragm 710 between open and fully closed, wherein the diaphragm contacts seat 712. Flexible diaphragm 710 is able to deform until valve 702 is closed, and can return to fully open due to the arrangement of encapsulated springs. In some embodiments, the diaphragm valve is actuated by an electric actuator, an electro-hydraulic actuator, a hydraulic actuator, an electro-pneumatic actuator, or a pneumatic actuator. In some embodiments, the actuator comprises an internal stop that prevents over-compression of the flexible diaphragm.

Figure 8A:
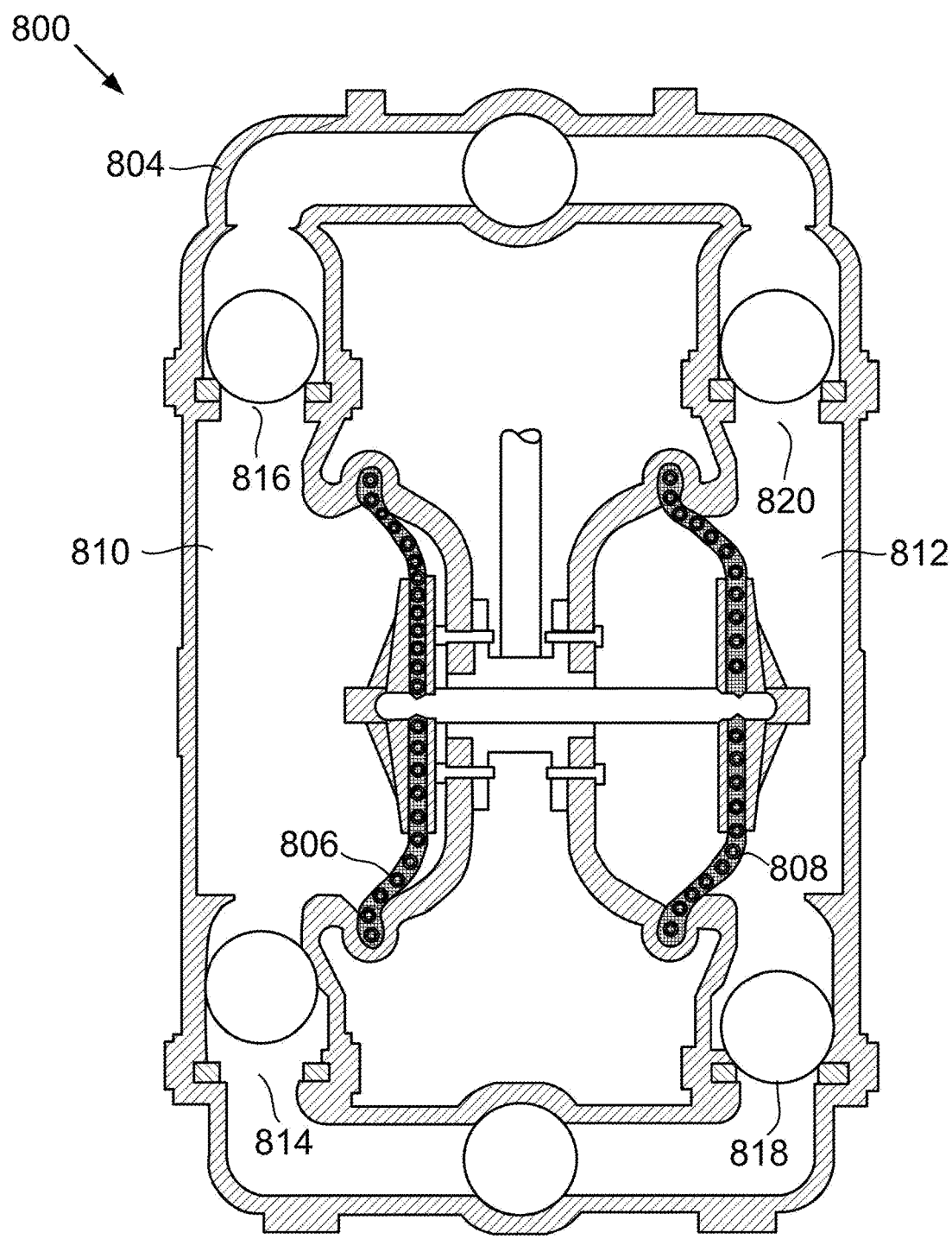
FIGS. 8A-C shows cross-sectional views of a double-diaphragm pump during right stroke, mid stroke, and left stroke.
Figure 8B:
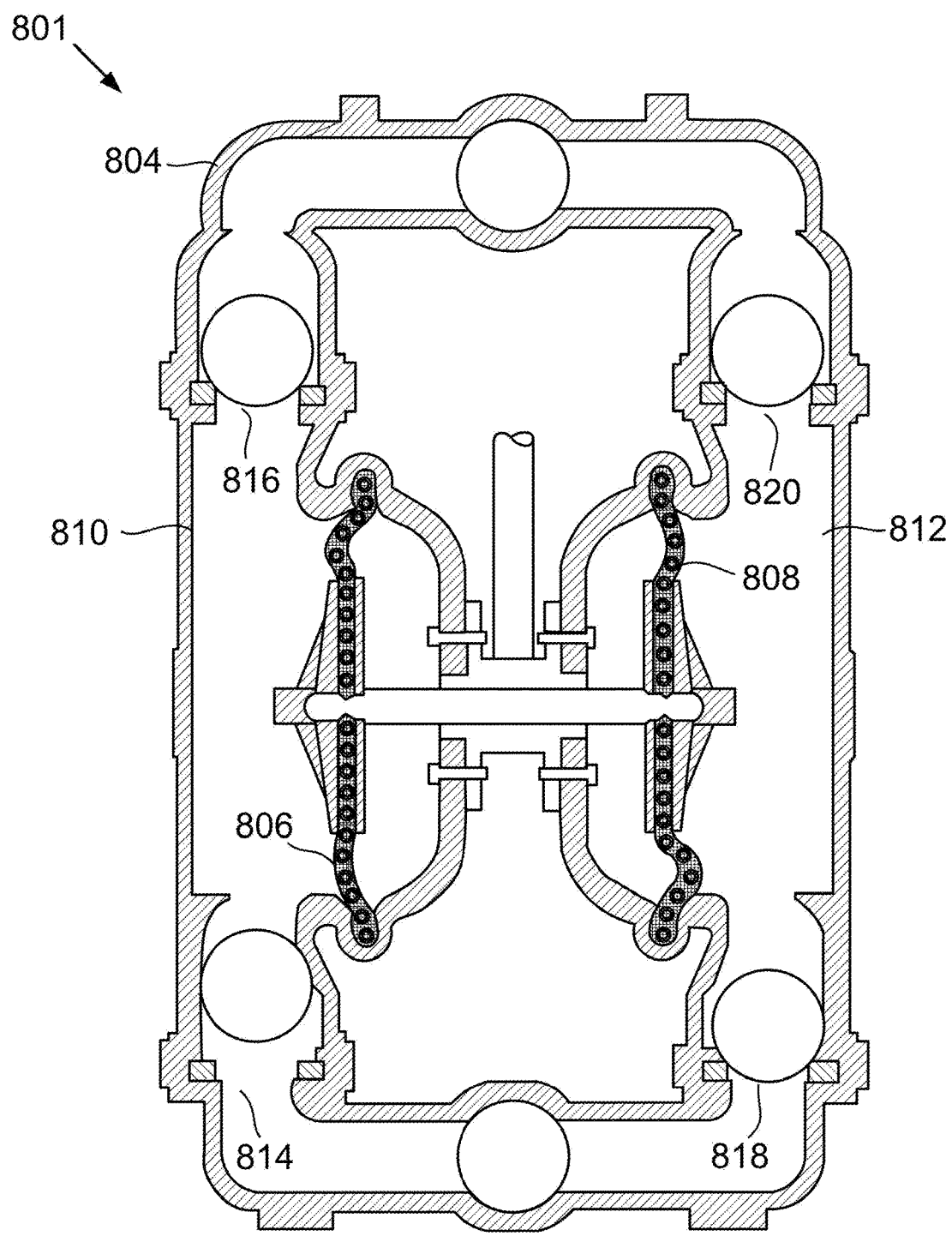
Figure 8C:
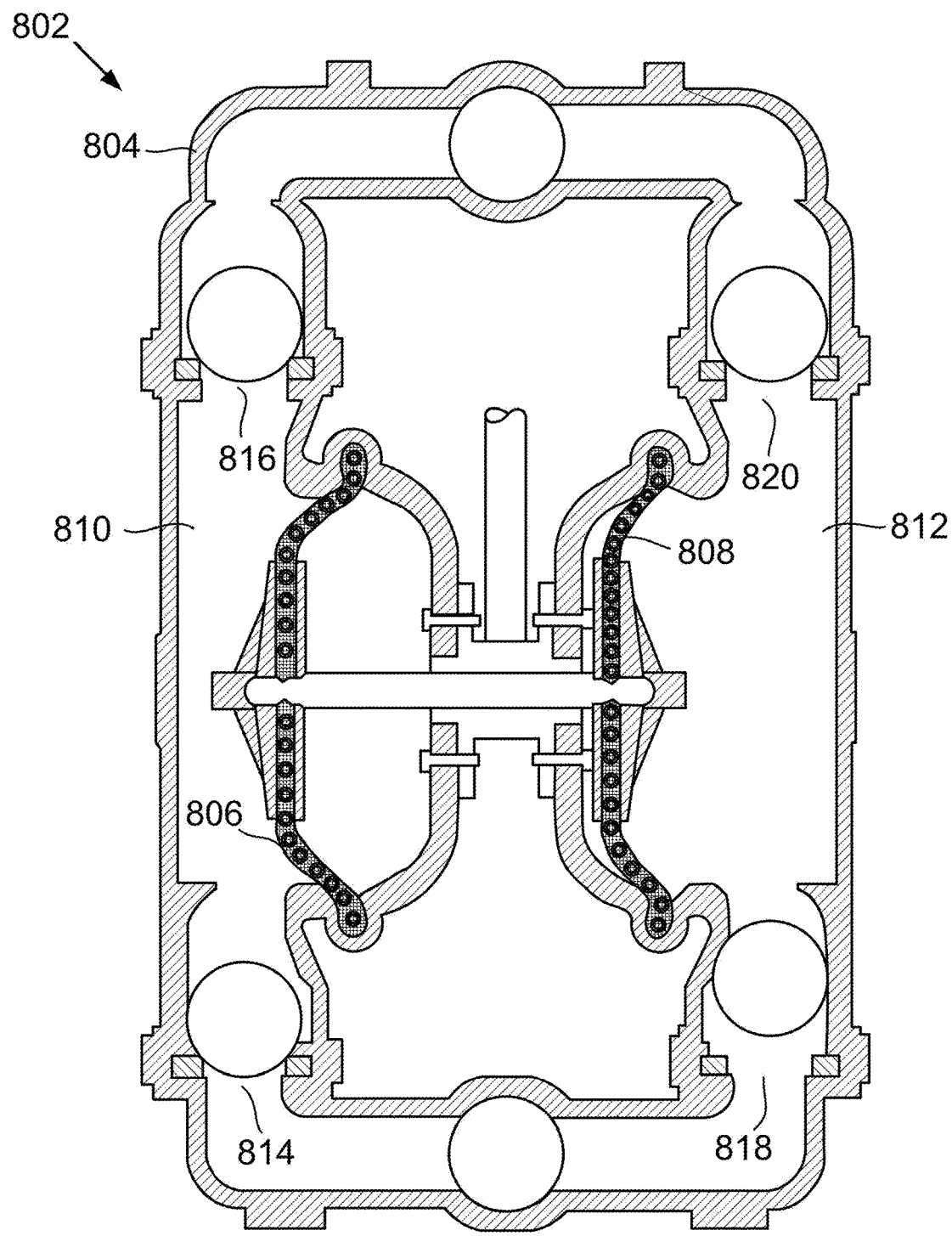

Referring to FIGS. 8A-C, cross-sectional views of a double-diaphragm pump are shown during right stroke at 800, mid stroke at 801, and left stroke at 802, as per one embodiment of the present invention. Diaphragm pump 804 comprises left diaphragm 806, right diaphragm 808, left chamber 810, right chamber 812, left-bottom check valve 814, left-top check valve 816, right-bottom check valve 818, and right-top check valve 820. Left and right diaphragms 806 and 808 are rectangular flexible diaphragms as in FIGS. 1A-B. Fluid is drawn into left chamber 810 and pushed out of right chamber 812 as right diaphragm 808 travels right, while left-bottom check valve 814 and right-top check valve 820 are open, as in 800. Left diaphragm 806 begins to move left at 801, opening left-top check valve 816 and right-bottom check valve 818, so fluid leaves left chamber 810 and begins to enter right chamber 812, as in 801. Finally, left diaphragm 806 moves fully left, drawing fluid into right chamber 812, pushing fluid out of left chamber 810, while left-top check valve 816 and right-bottom check valve 818 are open, as in 802. Left and right diaphragms 806 and 808 are beneficial to this process as the flexible diaphragm design used will return to the original open state after force is removed. In some embodiments, diaphragm pump 804 comprises a single-diaphragm diaphragm pump.

In some embodiments, the flexible diaphragm is used in a diaphragm pump and the diaphragm pump comprises an air/hydraulic fluid driven diaphragm pump, an electromechanically driven diaphragm pump, or an unsealed diaphragm pump.

In some embodiments, the one or more springs comprise compression springs, extension springs, helical springs, conical springs, hourglass springs, constant-pitch springs, variable-pitch springs, barrel springs, square springs, oval springs, flat-coil springs, scope-channel flat coil springs, magazine springs, or combinations thereof.

In some embodiments, the flexible diaphragm is used in a diaphragm-style pressure sensor.

In some embodiments, the flexible material comprises polytetrafluoroethylene, fluorinated ethylene propylene, perfluoroalkoxy polymer resin, polyether ether ketone, other polyaryl ether ketones, polyimides, the polyimide sold under the trademark of Vespel®, poly-oxydiphenylene-pyromellitimide, platinum-cured silicone, peroxide-cured silicone, thermoplastics, other rubbers, other polymers, or combinations thereof.

In some embodiments, the one or more springs comprise steel, titanium, aluminum, nickel, cobalt, alloys thereof, and combinations thereof.

In some embodiments, the flexible diaphragm maintains flexibility at cryogenic temperatures. In some embodiments, a cryogenic fluid passes across the flexible diaphragm, the cryogenic fluid comprising a liquid and a solid. In some embodiments, the cryogenic liquid comprises a liquid with a freezing point lower than the solids. In some embodiments, the solids comprise carbon dioxide, nitrogen oxide, sulfur dioxide, nitrogen dioxide, sulfur trioxide, hydrogen sulfide, hydrogen cyanide, water, mercury, hydrocarbons, pharmaceuticals, salts, biomass, particulates, other heavy metals, condensed organics, soot, inorganic ash components, salts, or combinations thereof.

In some embodiments, the springs are arrayed parallel to each other in two planes, forming a rectangular flexible diaphragm with two layers of springs.

The invention claimed is:

1. A device comprising:
an actuated diaphragm mechanism comprising an enclosure;
the enclosure defined by opposing flexible walls joined along a perimeter of the enclosure;
one or more coiled springs contained entirely between the opposed flexible walls and arrayed in concentric spirals around a central hole or arrayed in parallel bands; and,
a central, helical axis of the one or more coiled springs being disposed substantially parallel to the opposed flexible walls.

2. The device of claim 1, wherein the diaphragm mechanism is used in a diaphragm valve.

3. The device of claim 2, wherein the diaphragm valve is actuated by an actuator comprising a manual actuator, an electric actuator, an electro-hydraulic actuator, a hydraulic actuator, an electro-pneumatic actuator, or a pneumatic actuator.

4. The device of claim 3, wherein the actuator comprises an internal stop that prevents over-compression of the diaphragm mechanism.

5. The device of claim 1, wherein the diaphragm mechanism is used in a diaphragm-style pressure sensor.

6. The device of claim 5, wherein the spring spirals helically around a central point in a single plane, forming a disc shaped flexible diaphragm.

7. The device of claim 1, wherein the diaphragm mechanism is used in a diaphragm pump.

8. The device of claim 1, wherein the flexible walls comprise polytetrafluoroethylene, fluorinated ethylene propylene, perfluoroalkoxy polymer resin, polyether ether ketone, other polyaryl ether ketones, polyimides, the polyimide sold under the trademark of Vespel®, poly-oxydiphenylene-pyromellitimide, platinum-cured silicone, peroxide-cured silicone, thermoplastics, other rubbers, other polymers, or combinations thereof.

9. The device of claim 8, wherein the one or more springs comprise steel, titanium, aluminum, nickel, cobalt, alloys thereof, and combinations thereof.

10. The device of claim 9, wherein the diaphragm mechanism maintains flexibility at cryogenic temperatures.

11. The device of claim 10, wherein a cryogenic fluid passes across the diaphragm mechanism, the cryogenic fluid comprising a liquid, a solid, or a combination thereof.

12. The device of claim 11, wherein the cryogenic liquid comprises a liquid with a freezing point lower than the solids.

13. The device of claim 12, wherein the solids comprise carbon dioxide, nitrogen oxide, sulfur dioxide, nitrogen dioxide, sulfur trioxide, hydrogen sulfide, hydrogen cyanide, water, mercury, hydrocarbons, pharmaceuticals, salts, biomass, particulates, other heavy metals, condensed organics, soot, inorganic ash components, salts, or combinations thereof.

14. The device of claim 9, wherein the springs are arrayed parallel to each other in a single plane, forming a rectangular flexible diaphragm.

15. The device of claim 9, wherein the springs are arrayed parallel to each other in two planes, forming a rectangular flexible diaphragm with two layers of springs.

16. The device of claim 9, wherein the spring spirals helically around a central point in a single plane, forming a disc shaped flexible diaphragm.

17. The device of claim 9, wherein the spring spirals helically around a central point in two planes, forming a disc shaped flexible diaphragm.

18. The device of claim 9, wherein the spring passes back and forth in multiple passes, forming a rectangular flexible diaphragm.

19. A device comprising:
- a diaphragm valve comprising an actuated diaphragm mechanism and a compressing device;
- the compressing device comprising:
  - a valve body;
  - a plunger, attached to the actuated diaphragm mechanism, wherein the plunger presses the actuated diaphragm mechanism against the valve body;
  - a manual actuator, an electric actuator, an electro-hydraulic actuator, a hydraulic actuator, an electro-pneumatic actuator, or a pneumatic actuator, which moves the one or more plungers; and,
  - an internal stop that prevents over-compression of the actuated diaphragm mechanism; and,
- the actuated diaphragm mechanism comprising an enclosure;
- the enclosure defined by opposing flexible walls joined along a perimeter of the enclosure;
- one or more coiled springs contained entirely between the opposed flexible walls and arrayed in concentric spirals around a central hole or arrayed in parallel bands;
- a central, helical axis of the one or more coiled springs being disposed substantially parallel to the opposed flexible walls;
- the flexible walls comprise polytetrafluoroethylene, fluorinated ethylene propylene, perfluoroalkoxy polymer resin, polyether ether ketone, other polyaryl ether ketones, polyimides, the polyimide sold under the trademark of Vespel®, poly-oxydiphenylene-pyromellitimide, platinum-cured silicone, peroxide-cured silicone, thermoplastics, other rubbers, other polymers, or combinations thereof; and,
- the one or more springs comprise steel, titanium, aluminum, nickel, cobalt, alloys thereof, and combinations thereof.

20. A device comprising:
- an actuated diaphragm pump comprising one or more diaphragm mechanisms;
- the actuated diaphragm mechanism comprising an enclosure;
- the enclosure defined by opposing flexible walls joined along a perimeter of the enclosure;
- one or more coiled springs contained entirely between the opposed flexible walls and arrayed in concentric spirals around a central hole or arrayed in parallel bands;
- a central, helical axis of the one or more coiled springs being disposed substantially parallel to the opposed flexible walls;
- the flexible walls comprise polytetrafluoroethylene, fluorinated ethylene propylene, perfluoroalkoxy polymer resin, polyether ether ketone, other polyaryl ether ketones, polyimides, the polyimide sold under the trademark of Vespel®, poly-oxydiphenylene-pyromellitimide, platinum-cured silicone, peroxide-cured silicone, thermoplastics, other rubbers, other polymers, or combinations thereof; and,
- the one or more springs comprise steel, titanium, aluminum, nickel, cobalt, alloys thereof, and combinations thereof.

* * * * *